(12) United States Patent
Jain et al.

(10) Patent No.: US 9,342,376 B2
(45) Date of Patent: May 17, 2016

(54) METHOD, SYSTEM, AND DEVICE FOR DYNAMIC ENERGY EFFICIENT JOB SCHEDULING IN A CLOUD COMPUTING ENVIRONMENT

(75) Inventors: Nilesh K. Jain, Beaverton, OR (US); Theodore L. Willke, Tacoma, WA (US); Kushal Datta, Hillsboro, OR (US); Nezih Yigitbasi, Delft (NL)

(73) Assignee: Intel Corporation, Santa Clara, CA (US)

( * ) Notice: Subject to any disclaimer, the term of this patent is extended or adjusted under 35 U.S.C. 154(b) by 822 days.

(21) Appl. No.: 13/534,324

(22) Filed: Jun. 27, 2012

(65) Prior Publication Data
US 2014/0006534 A1    Jan. 2, 2014

(51) Int. Cl.
| | |
|---|---|
| H04L 15/16 | (2006.01) |
| G06F 9/50 | (2006.01) |
| G06F 9/46 | (2006.01) |
| G06F 1/20 | (2006.01) |
| G06F 1/32 | (2006.01) |
| H04L 12/24 | (2006.01) |

(52) U.S. Cl.
CPC .............. *G06F 9/5094* (2013.01); *G06F 1/206* (2013.01); *G06F 1/3203* (2013.01); *G06F 9/465* (2013.01); *G06F 9/5027* (2013.01); *H04L 41/12* (2013.01); *Y02B 60/142* (2013.01)

(58) Field of Classification Search
None
See application file for complete search history.

(56) References Cited

U.S. PATENT DOCUMENTS

| | | | | |
|---|---|---|---|---|
| 6,289,267 B1 * | 9/2001 | Alexander et al. | ............. | 700/286 |
| 7,912,955 B1 * | 3/2011 | Machiraju | ............. | G06F 9/5077 709/221 |
| 8,135,851 B2 * | 3/2012 | Pilkington | ............. | G06F 9/465 709/219 |
| 8,527,997 B2 * | 9/2013 | Bell, Jr. | ................. | G06F 9/5094 713/320 |
| 8,631,411 B1 * | 1/2014 | Ghose | ...................... | G06F 1/206 361/676 |
| 9,015,324 B2 * | 4/2015 | Jackson | ............... | G06F 9/5027 709/201 |
| 2005/0240745 A1 * | 10/2005 | Iyer et al. | ...................... | 711/167 |
| 2008/0115140 A1 * | 5/2008 | Erva et al. | ..................... | 718/104 |
| 2008/0133474 A1 * | 6/2008 | Hsiao et al. | ...................... | 707/3 |
| 2008/0162983 A1 * | 7/2008 | Baba et al. | ........................ | 714/3 |
| 2009/0171511 A1 | 7/2009 | Tolentino | | |
| 2010/0174886 A1 * | 7/2010 | Kimelman | ..................... | 712/28 |
| 2010/0293313 A1 * | 11/2010 | Ferringer et al. | ............. | 710/110 |
| 2011/0072293 A1 * | 3/2011 | Mazzaferri | ........... | G06F 1/3203 713/340 |
| 2011/0161696 A1 * | 6/2011 | Fletcher | ................ | G06F 1/3203 713/320 |
| 2011/0283119 A1 | 11/2011 | Szu et al. | | |

(Continued)

FOREIGN PATENT DOCUMENTS

| | | | |
|---|---|---|---|
| WO | 2011011404 A1 | 1/2011 | |
| WO | 2011106917 A1 | 9/2011 | |
| WO | 2014004132 A1 | 1/2014 | |

OTHER PUBLICATIONS

Author: Marvin Zelkowitz Title: Advances in Computers: Computer performance issues Date: May 11, 2009 Publisher: Academic Press vol. 75 pp. 171 and 175.*

International Search Report and Written Opinion received for PCT Patent Application No. PCT/US2013/045990, mailed on Oct. 17, 2013, 11 pages.

(Continued)

*Primary Examiner* — Ranodhi Serrao
*Assistant Examiner* — James Fiorillo
(74) *Attorney, Agent, or Firm* — Barnes & Thornburg LLP

(57) ABSTRACT

A method, system, and device for energy efficient job scheduling in a datacenter computing environment includes a master node. The master node can periodically receive energy data from slave nodes and dynamically assign computing tasks to be executed by the slave nodes based on the energy data.

24 Claims, 3 Drawing Sheets

(56) References Cited

U.S. PATENT DOCUMENTS

| | | | |
|---|---|---|---|
| 2012/0079380 A1* | 3/2012 | Tsai | G06F 17/30817 715/716 |
| 2013/0066477 A1 | 3/2013 | Jiang | |
| 2013/0290955 A1* | 10/2013 | Turner | H04L 41/12 718/1 |

OTHER PUBLICATIONS

Nezih et al., "Energy Efficient Scheduling of MapReduce Workloads on Heterogeneous Clusters," GCM '11, 2nd International Workshop on Green Computing Middleware (GCM), 2011, 6 pages.

"Apache Hadoop," Wikipedia, The Free Encyclopedia, retrieved from: <http://en.wikipedia.org/w/index.php?title=Apache_Hadoop&oldid=472088408>, edited Jan. 19, 2012, 12 pages.

"Cloud computing," Wikipedia, The Free Encyclopedia, retrieved from: <http://en.wikipedia.org/w/index.php?title=Cloud_computing&oldid=472145274>, edited Jan. 19, 2012, 10 pages.

"MapReduce," Wikipedia, The Free Encyclopedia, retrieved from: <http://en.wikipedia.org/w/index.php?title=MapReduce&oldid=472115149>, edited Jan. 19, 2012, 6 pages.

"Scheduling (computing)," Wikipedia, The Free Encyclopedia, retrieved from: <http://en.wikipedia.org/w/index.php?title=Scheduling_(computing)&oldid=469230658>, edited Jan. 3, 2012, 9 pages.

* cited by examiner

METHOD, SYSTEM, AND DEVICE FOR DYNAMIC ENERGY EFFICIENT JOB SCHEDULING IN A CLOUD COMPUTING ENVIRONMENT

BACKGROUND

"Cloud" computing often refers to the provision of computing resources as a service, usually by a number of computer servers that are networked together at location(s) that are remote from the location from which the services are requested. A cloud datacenter refers to a physical arrangement of servers that make up a cloud (e.g., racks, rooms, etc.). In some cases, a particular portion of a datacenter may be implemented as a "cluster" or "grid."

A cloud or cluster server or portions of its resources may be allocated physically or logically according to workload requirements. As an example, computing jobs that involve very large data sets and/or numerous computational tasks (such as big data analytics) may be distributed among multiple physical servers in a cluster and/or among multiple processes on the same server.

A scheduling system refers to computer software (e.g., middleware) used to allocate computing jobs among server resources in a cloud, cluster, or grid. For example, some scheduling systems designate one server as the "master" node of a cluster that includes a number of "slave" nodes, where the master node schedules tasks to be processed by its cluster in response to periodic "heartbeat" signals it receives from the slave nodes in its cluster.

BRIEF DESCRIPTION

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
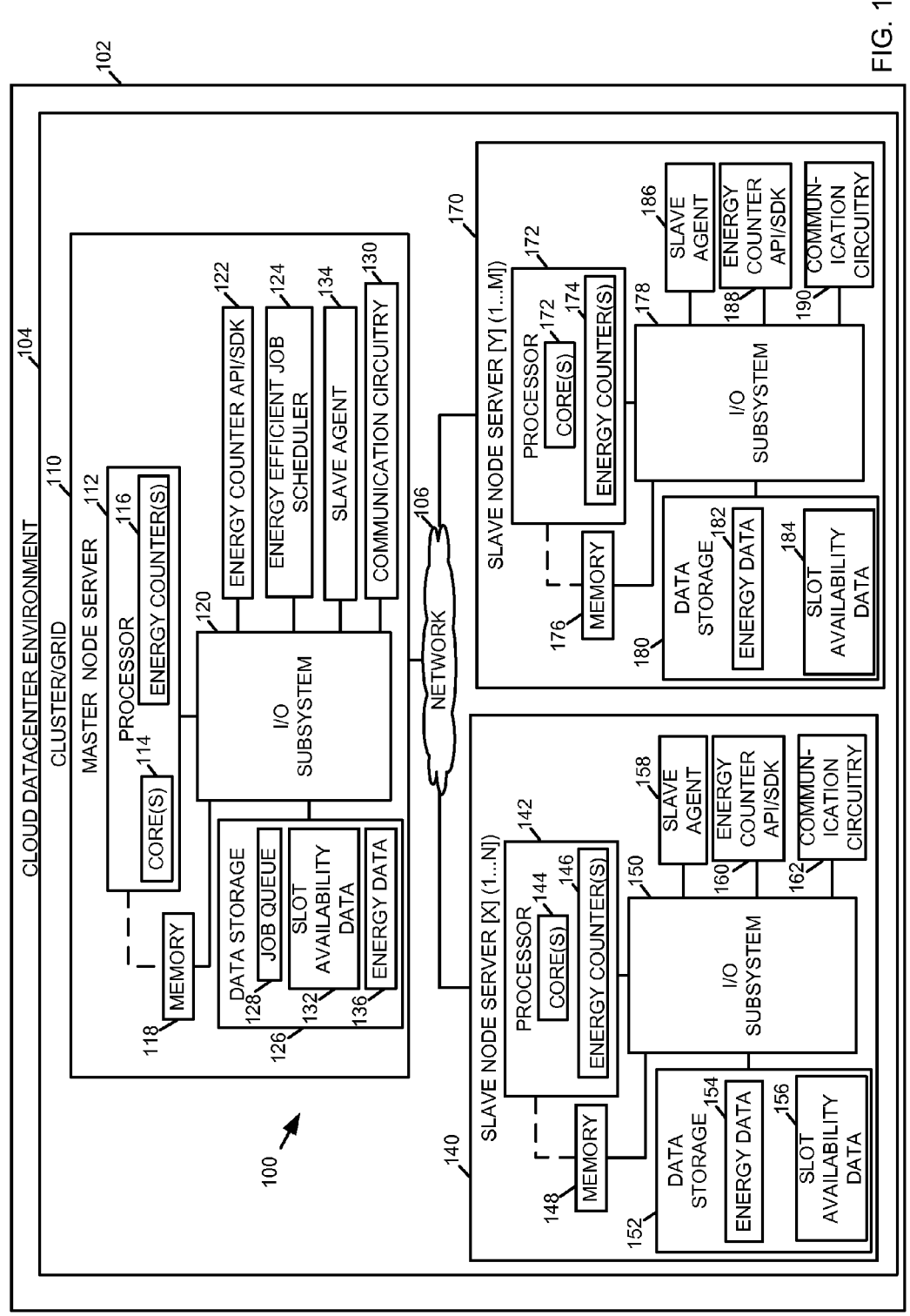
FIG. 1 is a simplified block diagram of at least one embodiment of a dynamic energy efficient job scheduling system for managing server hardware resources in a cloud datacenter environment.

While the concepts of the present disclosure are susceptible to various modifications and alternative forms, specific embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated by one skilled in the art, however, that embodiments of the disclosure may be practiced without such specific details. In other instances, control structures, gate level circuits and full software instruction sequences have not been shown in detail in order not to obscure the description of the of the concepts described herein. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the concepts described herein may be implemented in hardware, firmware, software, or any combination thereof. Embodiments implemented in a computer system may include one or more point-to-point or bus-based interconnects between components. Embodiments of the concepts described herein may also be implemented as instructions carried by or stored on one or more machine-readable or computer-readable storage media, which may be read and executed by one or more processors. A machine-readable or computer-readable storage medium may be embodied as any device, mechanism, or physical structure for storing or transmitting information in a form readable by a machine (e.g., a computing device). For example, a machine-readable or computer-readable storage medium may be embodied as read only memory (ROM) device(s); random access memory (RAM) device(s); magnetic disk storage media; optical storage media; flash memory devices; mini- or micro-SD cards, memory sticks, and others.

In the drawings, specific arrangements or orderings of schematic elements, such as those representing devices, modules, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. In addition, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, an illustrative system 100 for dynamic, energy efficient scheduling of computing jobs among a number of slave nodes 140, 170 of a cluster or grid 104 (referred to hereinafter as simply a "cluster" for ease of discussion) of a cloud datacenter environment 102 is managed by a master node 110. An energy efficient job scheduler 124, embodied in the master node 110, communicates with slave agents 158, 186 of the slave nodes 140, 170 to determine which of the slave nodes 140, 170 may be the most energy efficient node to perform a given type of computing job or task. As explained in detail below, the energy efficient job scheduler 124 assigns computing jobs or tasks to the slave nodes 140, 170 based on information about the incoming job or task and energy and availability information provided to the master node 110 periodically by the slave agents 158, 186 in real time. In this way, the energy efficiency of the cluster 104, and indeed the cloud datacenter environment 102, can be improved by matching computing jobs or tasks with the most appropriate energy efficient nodes for the particular type of job or task.

The illustrative cluster 104 is embodied as a collection of commodity computing devices that are connected to one another via the network 106 to function as a large multiprocessor. Further, the cluster 104 is embodied as a heterogeneous cluster. That is, the cluster 104 comprises a number (1 . . . N) of slave node servers[X], where N is a positive integer and X represents one type of hardware configuration (e.g., processor, memory, etc.), and the cluster 104 comprises a number (1 . . . M) of slave node servers[Y], where M is a positive integer and Y represents another type of hardware configuration that is not the same as X. One example of a heterogeneous cluster is a datacenter that has multi-generation hardware.

As illustrated, the slave nodes 140, 170 are separate physical servers managed by the master node server 110, but it should be appreciated by those skilled in the art that any or all of the "nodes" 110, 140, 170 may be logical rather than physical. That is, each physical server 110, 140, 170 may have one or more slave agents (e.g., 134, 158, 186) or a portion thereof running on it, using virtualization. In addition, the master node server 110 may host both the energy efficient job scheduler 124 and one or more slave agents 134, using virtualization, in some embodiments. The servers 110, 140, 170 are in communication with one another via the network 106, as described in further detail below.

The cluster 104 is just one of many such groupings of computing devices that can make up the datacenter environment 102. In other words, the datacenter environment 102 may include a number of heterogeneous clusters such as the cluster 104, a number of homogeneous clusters (e.g., similar hardware), and/or other computing devices. In the illustrative embodiments, the job scheduling for each cluster 104 is managed by a master node such as the master node server 110. For illustration purposes, the cluster 104 is described herein as supporting distributed computing, and more particularly, distributed computing on large data sets (sized in the petabytes range, in some examples) and/or highly distributable computations using a large number of server nodes (numbering in the thousands, in some examples). As such, the illustrative cluster 104 is described in the context of a software framework that is capable of processing highly distributable and/or data-intensive problems (e.g., big data analytics). For instance, in some embodiments, the cluster 104 may be embodied using an implementation of a MapReduce framework, such as an APACHE HADOOP open-source implementation. However, it should be appreciated by those skilled in the art that the aspects of the present disclosure are in no way limited to HADOOP implementations, or even to MapReduce frameworks more generally. Rather, the present disclosure can be applied in any job scheduling context in which computing jobs and/or tasks can be dynamically assigned to various hardware resources and where power and/or energy metrics are available.

In the illustrative embodiments, each of the node servers 110, 140, 170 is shown as having a similar or analogous hardware configuration. So as not to obscure the disclosure, the following description is presented in the context of the master node server 110 but applies equally to the corresponding elements of each of the node servers 140, 170 having the same names, as shown in FIG. 1. The illustrative master node server 110 includes at least one processor 112, memory 118, an input/output (I/O) subsystem 120, an energy counter application programming interface (API) and/or software development toolkit (SDK) 122, the energy efficient job scheduler 124, at least one data storage device 126, a job queue 128, communication circuitry 130, slot availability data 132, a slave agent 134, and energy data 136. The master node server 110 may be embodied as any suitable type of server computer or other computing device capable of performing the functions and features described herein as being performable by the master node server 110 or any of its components. For example, the master server 110 may be embodied as a computer, a personal computer (PC), a desktop computer, a laptop computer, a notebook computer, a handheld computer, a server, a server array or server farm, a web server, a network server, an enterprise server, an Internet server, a work station, a mini-computer, a main frame computer, a supercomputer, a network appliance, a web appliance, a distributed computing system, multiprocessor system, processor-based system, or combination of any of the foregoing.

The illustrative processor 112, 142, 172 includes at least one processor core 114, 144, 172 and one or more energy counters 116, 146, 174. The illustrative energy counters 116, 146, 174 monitor and output, in real time, information about the amount of power and/or energy currently being used by the processor 112, 142, 172 (and/or the core 114, 144, 172), e.g., the number of watts used, and the processor's current frequency (e.g., in megahertz or gigahertz). While in the illustrative embodiments the energy counters 116, 146, 174 are available in the processor 112, 142, 172, it should be understood by those skilled in the art that, in some embodiments, the requisite energy and/or power data may be obtained via special purpose tools or instrumentation available on the motherboard and/or by other devices that may be coupled to the processor 112, 142, 172.

In addition to an amount of cache memory, the processor 112, 142, 172 includes, or is otherwise communicatively coupled to, the memory 118, 148, 176. The memory 118, 148, 176 may be embodied as any type of suitable memory device, such as a dynamic random access memory device (DRAM), synchronous dynamic random access memory device (SDRAM), double-data rate dynamic random access memory device (DDR SDRAM), and/or other volatile memory device.

The processor 112, 142, 172 is also communicatively coupled to the I/O subsystem 120, 150, 178. While not specifically shown, the illustrative I/O subsystem 120, 150, 178 may include a memory controller (e.g., a memory controller subsystem or northbridge), an input/output controller (e.g., an input/output controller subsystem or southbridge), and a firmware device. Of course, in other embodiments, I/O subsystems having other configurations may be used. For example, in some embodiments, the I/O subsystem 120, 150, 178 may form a portion of a system-on-a-chip (SoC) and be incorporated, along with the processor 112, 142, 172 and other components of the servers 110, 140, 170, on a single integrated circuit chip. As such, it will be appreciated that each component of the I/O subsystem 120, 150, 178 may be located on a common integrated circuit chip in some embodiments.

The I/O subsystem 120 is communicatively coupled to the energy counter API/SDK 122, the energy efficient job scheduler 124, the data storage device 126, the communication circuitry 130, and the slave agent 134. The energy counter API/SDK 122, 160, 188 is embodied as one or more computerized programs, logic and/or instructions (e.g., software and/or firmware functions, libraries, drivers, operating system gadgets, and/or others) that enable software applications to import and export data generated by the energy counters 116, 146, 174. For example, some portions of the energy counter API/SDK 122, 160, 188 are configured to process the power and/or energy data generated by the energy counters 116, 146, 174, and convert it into energy metrics that can be used by software applications running on the master node server 110. Some examples of energy metrics include processor average power (Watts), cumulative energy consumed (joules), and instantaneous frequency. In the illustrative embodiments, the energy counter API/SDK 122, 160, 188 generates a CPU-related energy efficiency metric, performance per watt (perf/watt), where performance is defined as the reciprocal of task completion time (1/completion time), and generates an I/O-related energy efficiency metric, I/O operations per second (IOPS) per watt. The energy counter API/SDK 122, 160, 188 supplies these energy efficiency metrics to the corresponding slave agent 134, 158, 186 on a periodic basis, as described below. In addition, the energy efficiency metrics may be stored over time in the corresponding energy data 136, 154, 182.

The energy efficient job scheduler 124 is embodied as one or more computerized programs, logic and/or instructions (e.g., software and/or firmware) that are configured to process incoming computing jobs and/or tasks, store the incoming jobs/tasks in the job queue 128, and assign the jobs and/or tasks to the slave nodes 140, 170 (or a slave node running on the master node server 110), based on the energy efficiency data 136, 154, 182 and slot availability data 132, 156, 184 associated with the slave nodes 140, 170 and energy requirements associated with the particular job or task. Details relating to the operation of the energy efficient job scheduler 124 are described below with reference to FIGS. 2 and 3.

The slave agents 134, 158, 186 are each embodied as one or more computerized programs, logic and/or instructions (e.g., software and/or firmware) that are configured to periodically send "heartbeat" signals to the energy efficient job scheduler 124. Each heartbeat signal includes the current energy data 136, 154, 182 and slot availability data 132, 156, 184 associated with the server 110, 140, 170 issuing the heartbeat signals.

Portions of the data storage device 126, 152, 180 may be embodied as any suitable device for storing data and/or computer instructions, such as disk storage (e.g., hard disks), a network of physical and/or logical storage devices, and/or others. In the illustrative embodiment, the job queue 128, slot availability data 132, 156, 184 and energy data 136, 154, 182 reside in the corresponding data storage device 126, 152, 180. In addition, portions of the energy counter API/SDK 122, 160, 188, the energy efficient job scheduler 124, and/or the slave agent 134, 158, 186 may reside in the corresponding data storage device 126, 152, 180. Portions of the energy counter API/SDK 122, 160, 188, the energy efficient job scheduler 124, and/or the slave agent 134, 158, 186 may be copied to the corresponding memory 118, 148, 176 during operation, for faster processing or other reasons.

The communication circuitry 130, 162, 190 may be embodied as one or more devices and/or circuitry configured to enable communications between or among the master node server 110, the slave node server(s) 140, and/or the slave node server(s) 170, via the communication network 106. For example, the communication circuitry 130, 162, 190 may include one or more wired and/or wireless network interfaces or "cards" to facilitate communications over the wired and/or wireless portions of the network 106.

Although not specifically shown, the I/O subsystem 120, 150, 178 may be communicatively coupled to one or more peripheral device(s), such as a display, touchpad, keypad, microphone, speaker, and/or others, depending upon, for example, the intended use of the respective server 110, 140, 170. Further, it should be appreciated that the master node server 110, and/or any of the slave node servers 140, 170, may include other components, sub-components, and devices not illustrated in FIG. 1 for clarity of the description.

The network 106 may be embodied as any type of wired and/or wireless telecommunications network. For example, the network 106 may be embodied as or otherwise include one or more public or private cellular networks, telephone, Digital Subscriber Line (DSL) or cable networks, local or wide area networks, publicly available global networks (e.g., the Internet), or any combination thereof. For example, in some embodiments, the network 106 may be embodied as or otherwise include a Global System for Mobile Communications (GSM) cellular network. Additionally, the network 106 may include any number of additional devices as needed to facilitate communication between or among the master node server 110 and/or the slave node servers 140, 170, such as routers, switches, intervening computers and/or others. Any suitable communication protocol (e.g., TCP/IP) may be used to effect communication over the network 106, depending on, for example, the particular type or configuration of the network 106.

In general, the components of the master node server 110 and the slave node servers 140, 170 are communicatively coupled as shown in FIG. 1, by one or more signal paths. Such signal paths may be embodied as any type of wired or wireless signal paths capable of facilitating communication between the respective devices. For example, the signal paths may be embodied as any number of wires, printed circuit board traces, via, bus, point-to-point interconnects, intervening devices, and/or the like. Also, generally speaking, some of the components of the computing devices described above may be incorporated on a motherboard while other components may be communicatively coupled to the motherboard via, for example, a peripheral port.

Figure 2:
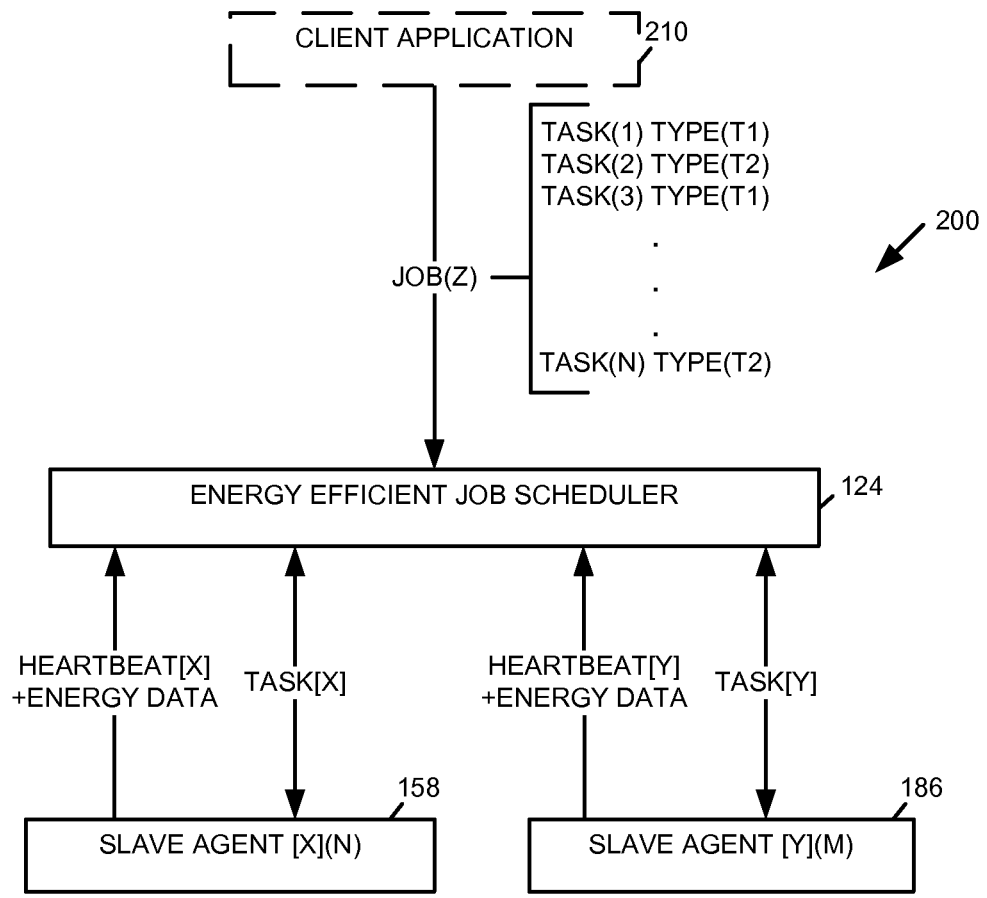
FIG. 2 is a simplified module diagram of at least one embodiment of executable modules of the system of FIG. 1.

Referring now to FIG. 2, in an embodiment 200 of the system 100, each of the illustrative energy efficient job scheduler 124 and the slave agents 134, 158, 186 is embodied as one or more computerized modules (e.g., software and/or firmware). The energy efficient job scheduler 124 periodically receives computing jobs or tasks, e.g., from client applications 210 running on end user computing devices and/or other computing devices connected to the network 106. One example of a job or task that may be received from a client application 210 is a web search that is initiated by an end user at a computing device that is connected to the network 106 via the Internet. Some other examples of jobs that may be handled by the energy efficient job scheduler 124 include web crawling, text tokenizers, page ranking, document processing, and clickstream analysis.

In the illustrative embodiment, a job(z), where z is a positive integer, can be broken down by the energy efficient job scheduler 124 into a number of tasks (1 ... N), where N is a positive integer. Each of the tasks (1 ... N) can be classified as a certain type of task (e.g., T1, T2). In addition, the tasks (1 ... N) that make up the job(z) can be distributed among multiple slave nodes 140, 170 for execution. In the web search illustration, the job of searching the web for a specific combination of search terms input by a user may be broken down into smaller tasks, where each task involves searching a particular domain of the Internet or conducting a search on a specific permutation of the search term, for example.

In the context of the illustrative MapReduce framework, input data associated with a job (e.g., data that may be used by the job and/or one or more tasks, which may reside in a file system, such as the file system known as the HADOOP File System or HDFS), is split and distributed among the cluster nodes. The job is divided into a number of tasks, based on the size of the input data. Each task can be classified as either a "map" task or a "reduce" task. Generally speaking, map tasks are smaller, sub-tasks that can be distributed to the slave nodes and performed thereby, while reduce tasks are tasks that collect and combine the results of all of the map tasks to form the output resulting from completion of the job. As such, map tasks are typically computation-intensive while reduce tasks tend to be more I/O intensive. The number of map tasks and the number of input splits may have a 1:1 correspondence.

More generally, that is, irrespective of the framework on which the energy efficient job scheduler 124 may be based, any job may have tasks or sub-portions that can be classified similarly, as computation-intensive, I/O intensive, or using any other suitable classification scheme. In other words, the number of task types may be determined, and tasks may be classified in any number of ways, according to the requirements of a particular design and/or implementation of the system 100.

As noted above, the slave agents [X] (N) 158 and [Y] (M) 186 send periodic heartbeat signals to the energy efficient job scheduler 124. In the illustrative embodiments, each heartbeat signal includes a data structure containing the current energy efficiency data 136, 154, 182 for the server issuing the heartbeat signal, as well as the server's slot availability data 132, 156, 184. In some MapReduce implementations, the slot availability data 132, 156, 184 includes information relating to the number of "slots" that are available at the server issuing the heartbeat signal to receive map tasks and the number of slots that are available to receive reduce tasks. More generally, in other embodiments, the slot availability data 132, 156, 184 simply includes data that gives an indication of the corresponding server's capacity to accept new jobs or tasks. In response to a heartbeat signal, the energy efficient job scheduler 124 traverses the job queue 128 in priority order and determines which tasks to assign to the server from which the current heartbeat signal was received.

Figure 3:
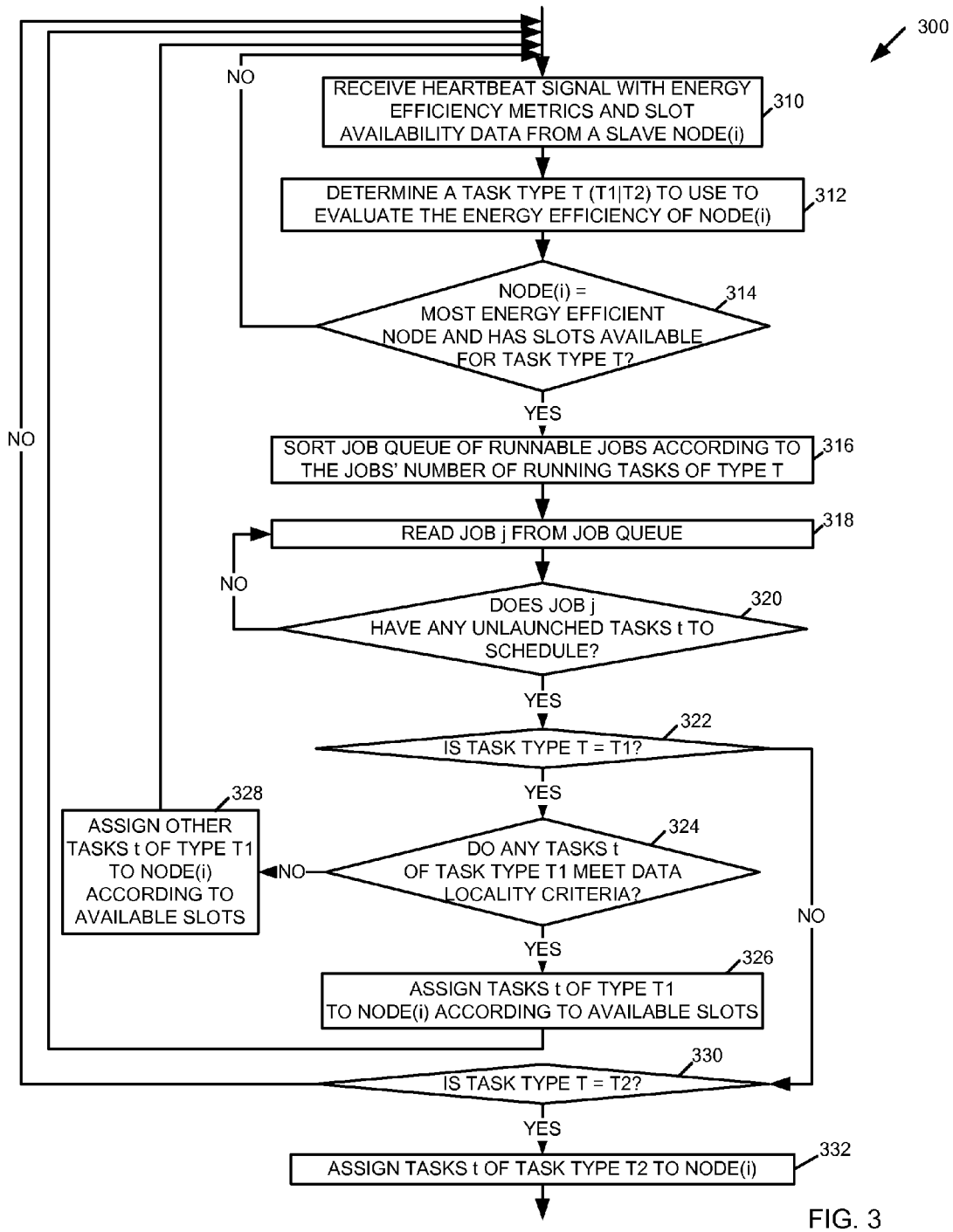
FIG. 3 is a simplified flow diagram of at least one embodiment of a method for dynamically scheduling jobs using energy efficiency metrics in the system of FIG. 1.

Referring now to FIG. 3, an illustrative method 300 executable as computerized logic and/or instructions by the various modules of the energy efficient job scheduler 124 is shown. At block 310, the method 300 receives a heartbeat signal from one of the slave agents 134, 158, 186. As noted above, the heartbeat signal includes the energy efficiency metrics (e.g., records per joule and IOPS/watt) and slot availability data 132, 156, 184 associated with the server 110, 140, 170 ("slave node(i)") on which the slave agent 134, 158, 186 is running.

Different types of computing tasks may have different energy efficiency characteristics, as mentioned above. At block 312, the method 300 determines a given type of computing task, T, to use as a basis for evaluating the energy efficiency of the slave node(i). In the illustrative method 300, two task types, T1 or T2 (e.g., map or reduce) are shown. However, in other embodiments, incoming tasks may be classified as one of any number of task types. For each heartbeat signal, the method 300 processes tasks of one of the tasks types (e.g., T1 or map tasks) first, and then processes tasks of the other task type(s), in the illustrative embodiments. In some embodiments, the processing of at least some tasks by the method 300 may be prioritized in other ways, not prioritized at all, or performed concurrently rather than sequentially. Block 312 deals with a particular task type T (e.g., T1 or T2) depending on the task type that is selected for processing.

At block 314, the method 300 determines whether the current slave node, "node(i)" (that is, the node from which the method 300 received a heartbeat signal at block 310) is the most energy efficient node for the task type determined at block 312. If the node(i) is not the most energy efficient node for the task type or does not have any slots available for that task type, then the method 300 returns to block 310 without scheduling any tasks to the node(i). As an example, if the task type T relates to map tasks (or, tasks that are computation-intensive), and the node(i) has a good (e.g., high) value for the energy efficiency metric for computation-intensive tasks (e.g., a high number of records per joule), then the node(i) may be considered the most energy efficient node for the task type. Conversely, if the task type T is map, but the node(i) has a high value for the energy efficiency metric for I/O intensive tasks (e.g., a high number of IOPS/watt) but a lower value for the energy efficiency metric for computation-intensive tasks, then the node(i) may not be considered the most energy efficient node for the task type. In determining whether a node(i) is the most energy efficient node for a task type T, the method 300 uses a greedy heuristic algorithm, e.g., a strategy of looking for the best or optimal choice on a local level (e.g., within the cluster 104) rather than on a global level (e.g., across clusters or within the entire datacenter environment 102). In addition, at block 314, the method 300 determines, from the slot availability data 132, 156, 184, whether the node(i) has the capacity (e.g., available slots) to accept tasks of the task type T.

If the node(i) is the most energy efficient node for the task type T, and the node(i) has the capacity to accept tasks of the task type T, then the method 300 determines a number of tasks to schedule to the node(i) based on the slot availability data 132, 156, 184 for the node(i), and proceeds to schedule tasks of type T to that node until the node(i) is no longer the most energy efficient node (e.g., until the value of the node(i)'s energy efficiency metric is no longer considered the "best" value for the task type T), or the node(i) no longer has the capacity to accept tasks of task type T. If the node(i) is not the most energy efficient node for the task type T, or does not have available slots for the task type T, the method 300 returns to block 310.

At block 316, the job queue 128, which contains data relating to the runnable jobs that have been received by the energy efficient job scheduler 124 and the number of running tasks associated with each job, is sorted to give higher priority to those jobs that have a higher number of running tasks (e.g., for fairness). At block 318, a job j and data relating to its associated tasks is read from the top of the job queue 128. At block 320, the method 300 determines whether the job j has any unlaunched tasks t (e.g., tasks that are runnable but not yet running) that need to be scheduled. If the job j does not have any unlaunched tasks t, the method 300 returns to block 318 and begins processing of the next job j in the job queue 128. If the job j does have unlaunched tasks t, the method processes tasks t that are of task type T1 first, and then processes tasks t that are of task type T2. So, if the method 300 is currently processing tasks of task type T1 (determined at block 322), the method 300 proceeds to block 324. If the method is not currently processing tasks of task type T1 (determined at block 322), the method proceeds to block 330, where it is determined whether tasks of type T2 are currently being processed.

If tasks of task type T1 are currently being processed, then at block 324, the method 300 determines whether any of the unlaunched tasks t of the current job j are of the task type T1, and if so, evaluates the data locality of each of the unlaunched tasks t that are of the task type T1. The data locality analysis can be used to assign tasks to nodes on which the associated input data (e.g., "split") is already located, to avoid unnecessary data transfer I/O operations, or for other reasons. In some embodiments, the data locality analysis may consider not only node-level locality, but also rack-level and off-rack locality. For instance, considering rack-level locality, even if the input data for a task is not located on the node(i) but is located on another node within the same rack as the node(i), the method 300 may schedule the task to the node(i) in some embodiments. In other embodiments, the data locality analysis may require tasks to be assigned to the node that contains the associated input split (e.g., ignoring rack- and off-rack locality). As should be appreciated by those skilled in the art, the degree to which data locality is considered by the method 300 can be varied according to the requirements of a particular design or implementation of the method 300.

Referring to blocks 326 and 328, the method first assigns the tasks t of task type T1 that meet the data locality criteria as determined at block 324, for execution by the node(i), at block 326, and then, at block 328, assigns any other tasks t of task type T1 to the node(i), according to the number of slots remaining available at the node(i). Once all of the tasks t of task type T1 have been processed, at block 332, the method 300 schedules tasks t of task type T2 to the node(i) in accordance with the energy efficiency of the node(i) and available slots for the task type T2. While described herein as being performed in a more or less sequential manner, it should be understood that the scheduling of tasks of types T1 and T2 may be done concurrently, in some embodiments.

EXAMPLES

Illustrative examples of the devices, systems, and methods disclosed herein are provided below. An embodiment of the devices, systems, and methods may include any one or more, and any combination of, the examples described below.

In an example, a master node for use in a datacenter computing environment comprising a communication network and a plurality of slave nodes includes an energy efficient job scheduler to periodically receive energy data from the slave nodes, periodically receive computing jobs including one or more unlaunched computing tasks, determine a task type for an unlaunched computing task, and assign the unlaunched computing task to a slave node in response to the energy data received from the slave node based on the task type.

In an example, the energy efficient job scheduler may be embodied as middleware of the master node and the master node may be embodied as a server computer. In an example, the energy data received from a slave node by the energy efficient job scheduler may indicate whether the slave node is more energy efficient for processor-intensive tasks or for input-output intensive tasks. In an example, the energy efficient job scheduler may assign the unlaunched computing task to a first slave node that is more energy efficient for processor-intensive tasks in response to determining that the task type is a first task type and may assign the unlaunched computing task to a second slave node that is more energy efficient for input-output intensive tasks in response to determining that the task type is a second task type different than the first task type. In an example, the energy efficient job scheduler may implement a MapReduce framework, where the first task type is "Map" and the second task type is "Reduce." In an example, the energy efficient job scheduler may determine whether data associated with the unlaunched computing task is local to a slave node or a rack containing the slave node, and may assign the unlaunched computing task to the slave node in response to determining that data associated with the unlaunched computing task is local to the slave node or the rack containing the slave node. In an example, the energy efficient job scheduler may maintains a job queue including computing jobs having unlaunched computing tasks, and may periodically receive slot availability data from the slave nodes, where the slot availability data may indicate a number of slots a slave node has available for unlaunched computing tasks, and may determine a number of unlaunched computing tasks to assign to the slave node in response to the number of available slots. In an example, the energy efficient job scheduler may periodically receive, from the slave nodes, first slot availability data indicating a first number of slots a slave node has available for unlaunched tasks of a first task type and second slot availability data indicating a second number of slots the slave node has available for unlaunched tasks of a second task type, and may assign the unlaunched computing tasks to the slave nodes based on the task type and the first and second slot availability data. In an example, the plurality of slave nodes may include a heterogeneous cluster of computing devices, and the energy efficient job scheduler may selectively assign the unlaunched computing tasks to computing devices in the heterogeneous cluster.

In another example, a slave node for use in a datacenter computing environment including a communication network and a master node configured to assign computing tasks to a plurality of slave nodes includes a slave agent to periodically send energy data to the master node and receive unlaunched computing tasks from the master node for execution by the slave node in response to the energy data sent by the slave node to the master node, where the received unlaunched computing tasks each have a task type that corresponds to the energy data sent by the slave node to the master node. In an example, the master node and the slave node may be embodied as server computers. In an example, the master node and the slave node may be embodied as virtual nodes running on the same server computer. In an example, the energy data may include a first energy metric including records per joule and a second energy metric including input-output operations per second per watt. In an example, the slave agent may be configured to periodically send slot availability data for each task type to the master node and receive unlaunched computing tasks from the master node for execution by the slave node in response to the slot availability data.

In another example, a system for energy efficient job scheduling in a datacenter computing environment includes a plurality of slave nodes each comprising a slave agent; and a master node comprising an energy efficient job scheduler to periodically receive energy data from the slave agents and assign unlaunched computing tasks each having a task type to the slave nodes in response to the energy data received from the slave agents and based on the task type.

In an example, the plurality of slave nodes may be embodied as a heterogeneous cluster of computing devices comprising at least one first computing device that is more energy efficient for processor-intensive computing tasks and at least one second computing device that is more energy efficient for input-output intensive computing tasks. In an example, the master node may assign unlaunched computing tasks of a first task type to slave nodes embodied as at least one computing device that is more energy efficient for processor-intensive computing tasks. In an example, the master node may receive locality data associated with the unlaunched tasks from the slave agents and may assign unlaunched computing tasks of the first type to slave nodes based on the locality data. In an example, the master node may assign unlaunched computing tasks of a second task type to slave nodes embodied as at least one computing device that is more energy efficient for input-output intensive computing tasks. In an example, the master node may execute a greedy heuristic algorithm to assign the unlaunched computing tasks to the slave nodes.

In another example, a method for scheduling a plurality of unlaunched computing tasks to be executed by one or more slave nodes in a datacenter computing environment includes periodically receiving, at a master node of the datacenter computing environment, energy and availability data from each of the slave nodes, and, in response to receiving energy and availability data from one of the slave nodes, determining whether the slave node is an energy efficient node for a first type of computing task.

In an example, the method may include, in response to determining that the slave node is an energy efficient node for the first type of computing task, determining a number of unlaunched computing tasks of the first type to assign to the slave node based on the availability data for the slave node. In an example, the method may include assigning the determined number of unlaunched tasks of the first type to the slave node according to locality data associated with each of the determined number of unlaunched tasks of the first type. In an example, the method may include, in response to determining that the slave node is not an energy efficient node for the first type of computing task, determining whether the slave node is an energy efficient node for a second type of computing task. In an example, the method may include, in response to determining that the slave node is an energy efficient node for the second type of computing task, determining a number of unlaunched tasks of the second type to assign to the slave node based on the availability data for the slave node. In an example, the method may include assigning the determined number of unlaunched tasks of the second type to the slave node. In an example, the method may include repeating the determining whether the slave node is an energy efficient node for a first type of computing task and assigning the determined number of unlaunched tasks of the first type to the slave node until it is determined that the slave node is no longer an energy efficient node for the first type of computing task.

In another example, at least one machine accessible storage medium includes a plurality of instructions that in response to being executed result in a computing device, periodically receiving, at a master node of the datacenter computing environment, energy and availability data from each of the slave nodes, and, in response to receiving energy and availability data from one of the slave nodes, determining whether the slave node is an energy efficient node for a first type of computing task.

In an example, the at least one computer accessible storage medium may include, in response to determining that the slave node is an energy efficient node for the first type of computing task, determining a number of unlaunched computing tasks of the first type to assign to the slave node based on the availability data for the slave node. In an example, the at least one computer accessible storage medium may include assigning the determined number of unlaunched tasks of the first type to the slave node according to locality data associated with each of the determined number of unlaunched tasks of the first type. In an example, the at least one computer accessible storage medium may include, in response to determining that the slave node is not an energy efficient node for the first type of computing task, determining whether the slave node is an energy efficient node for a second type of computing task. In an example, the at least one computer accessible storage medium may include, in response to determining that the slave node is an energy efficient node for the second type of computing task, determining a number of unlaunched tasks of the second type to assign to the slave node based on the availability data for the slave node; and assigning the determined number of unlaunched tasks of the second type to the slave node. In an example, the at least one computer accessible storage medium may include repeating the determining whether the slave node is an energy efficient node for a first type of computing task and assigning the determined number of unlaunched tasks of the first type to the slave node until it is determined that the slave node is no longer an energy efficient node for the first type of computing task.

While the concepts of the present disclosure have been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

The invention claimed is:

1. At least one non-transitory computer accessible storage medium comprising a plurality of instructions that in response to being executed result in a computing device:
    periodically receiving, at a master node server computer of the datacenter computing environment, computing jobs comprising one or more unlaunched computing tasks that have a first task type;
    periodically receiving, at the master node server computer of a datacenter computing environment, energy data and slot availability data from each of a plurality of slave node servers, and, in response to receiving energy data and slot availability data from one of the slave node servers, determining whether the slave node server is an energy efficient node for a first type of computing task, wherein the energy data comprises performance energy data associated with a performance per unit of power metric of a slave node server and input/output energy data associated with an input/output operations per unit of power metric of the slave node server and the slot availability data is indicative of whether the slave node server has an available slot for a task of the first task type;

comparing the first task type to the energy data;

determining if the slave node server has an available slot for a task of the first task type by comparing the first task type to the slot availability data;

assigning the first type of computing task to the slave node server in response to the task type corresponding to the enemy data and the task type corresponding to the slot availability data, wherein the task type is indicative of whether the unlaunched computing task is a computation-intensive task or an input/output-intensive task and the slot availability data is indicative of whether the slave node sever has an available slot for a task of the task type; and processing, by the slave node server, the unlaunched computing task, assigned by the master node server computer, wherein the computing task is launched.

2. The at least one non-transitory computer accessible storage medium of claim 1, comprising, in response to determining that the slave node server is an energy efficient node for the first type of computing task, determining a number of unlaunched computing tasks of the first type to assign to the slave node server based on the availability data for the slave node server.

3. The at least one non-transitory computer accessible storage medium of claim 2, comprising assigning the determined number of unlaunched tasks of the first type to the slave node server according to locality data associated with each of the determined number of unlaunched tasks of the first type.

4. The at least one non-transitory computer accessible storage medium of claim 3, comprising, in response to determining that the slave node server is not an energy efficient node for the first type of computing task, determining whether the slave node server is an energy efficient node for a second type of computing task.

5. The at least one non-transitory computer accessible storage medium of claim 4, comprising, in response to determining that the slave node server is an energy efficient node for the second type of computing task, determining a number of unlaunched tasks of the second type to assign to the slave node server based on the availability data for the slave node server; and assigning the determined number of unlaunched tasks of the second type to the slave node server.

6. The at least one non-transitory computer accessible storage medium of claim 3, comprising repeating the determining whether the slave node server is an energy efficient node for a first type of computing task and assigning the determined number of unlaunched tasks of the first type to the slave node server until it is determined that the slave node server is no longer an energy efficient node for the first type of computing task.

7. A method for scheduling a plurality of unlaunched computing tasks to be executed by one or more slave node server computers in a datacenter computing environment, the method comprising:

periodically receiving, at a master node server computer of the datacenter computing environment, computing jobs comprising one or more unlaunched computing tasks that have a first task type;

periodically receiving, at the master node server computer of the datacenter computing environment, energy data and slot availability data from each of the slave node servers, wherein the energy data comprises performance energy data associated with a performance per unit of power metric of the slave node server and input/output energy data associated with an input/output operations per unit of power metric of the slave node server, and the slot availability data is indicative of whether the slave node server has an available slot for a task of the first task type and wherein, in response to receiving energy and slot availability data from one of the slave node servers, determining whether the slave node server is an energy efficient node for the first type of computing task by:

(i) comparing the first task type to the energy data, (ii) determining if the slave node server has an available slot for a task of the first task type by comparing the first task type to the availability data, (iii) assigning the first type of computing task to the slave node server in response to the task type corresponding to the energy data and the task type corresponding to the slot availability data, wherein the task type is indicative of whether the unlaunched computing task is a computation-intensive task or an input/output-intensive task and the slot availability data is indicative of whether the slave node server has an available slot for a task of the task type; and processing, by the slave node server, the unlaunched computing task, assigned by the master node server computer, wherein the computing task is launched.

8. The method of claim 7, comprising, in response to determining that the slave node server is an energy efficient node for the first type of computing task, determining a number of unlaunched computing tasks of the first type to assign to the slave node server based on the availability data for the slave node server.

9. The method of claim 8, comprising assigning the determined number of unlaunched tasks of the first type to the slave node server according to locality data associated with each of the determined number of unlaunched tasks of the first type.

10. The method of claim 9, comprising, in response to determining that the slave node server is not an energy efficient node for the first type of computing task, determining whether the slave node server is an energy efficient node for a second type of computing task.

11. The method of claim 10, comprising, in response to determining that the slave node server is an energy efficient node for the second type of computing task, determining a number of unlaunched tasks of the second type to assign to the slave node server based on the availability data for the slave node server; and assigning the determined number of unlaunched tasks of the second type to the slave node server.

12. The method of claim 9, comprising repeating the determining whether the slave node server is an energy efficient node for a first type of computing task and assigning the determined number of unlaunched tasks of the first type to the slave node server until it is determined that the slave node server is no longer an energy efficient node for the first type of computing task.

13. A master node server computer for use in a datacenter computing environment comprising a communication network and a plurality of slave node server computers, the master node server computer comprising:

at least one processor; and a memory having stored therein a plurality of instructions that, when executed, cause the master node server computer to establish an energy efficient job scheduler to receive, from a slave node server, a periodic signal comprising energy data and slot availability data, wherein the enemy data comprises performance enemy data associated with a performance per unit of power metric of the slave node server and input/output enemy data associated with an input/output operations per unit of power metric of the slave node server;

periodically receive computing jobs comprising one or more unlaunched computing tasks; and in response to the periodic signal:

(i) determine a task type for an unlaunched computing task, the task type indicative of whether the unlaunched computing task is a computation-intensive task or an input/output-intensive task;

(ii) determine whether the slave node server has an available slot for a task of the task type based on a comparison of the task type to the slot availability data;

(iii) in response to a determination that the unlaunched computing task is a computation-intensive task, determine whether the slave node server is an energy efficient node for the computation-intensive task based on a comparison of the task type to the energy data, and assign the computation-intensive task to the slave node server in response to a determination that the slave node server has the available slot and the slave node server is an energy efficient node for the computation-intensive task; and (iv) in response to a determination that the unlaunched computing task is an input/output-intensive task, determine whether the slave node server is an energy efficient node for the input/output-intensive task based on a comparison of the task type to the energy data and assign the input/output-intensive task to the slave node server in response to a determination that the slave node server has the available slot and the slave node server is an energy efficient node for the input/output-intensive task.

14. The master node server computer of claim 13, wherein the energy efficient job scheduler maintains a job queue comprising a plurality of computing jobs having unlaunched computing tasks, periodically receives slot availability data tom the slave node servers, the slot availability data indicating a number of slots a slave node server has available for unlaunched computing tasks, and determines a number of unlaunched computing tasks to assign to the slave node server in response to the number of available slots.

15. The master node server computer of claim 14, wherein the energy efficient job scheduler periodically receives, from the slave node servers, first slot availability data indicating a first number of slots a slave node server has available for unlaunched tasks of a first task type and second slot availability data indicating a second number of slots the slave node server has available for unlaunched tasks of a second task type, and assigns the unlaunched computing tasks to the slave node servers based on the task type and the first and second slot availability data.

16. The master node server computer of claim 13, wherein the energy efficient job scheduler is embodied as middleware of the master node server.

17. The master node server computer of claim 13, wherein the energy efficient job scheduler implements a MapReduce framework, the first task type is "Map" and the second task type is "Reduce".

18. The master node server computer of claim 13, wherein the energy efficient job scheduler determines whether data associated with the unlaunched computing task is local to a slave node server or a rack containing the slave node server, and assigns the unlaunched computing task to the slave node server in response to determining that data associated with the unlaunched computing task is local to the slave node server or the rack containing the slave node server.

19. The master node computer server of claim 13, wherein the plurality of slave node servers comprises a heterogeneous cluster of computing devices, and the energy efficient job scheduler selectively assigns the unlaunched computing tasks to computing devices in the heterogeneous cluster.

20. A slave node server computer for use in a datacenter computing environment comprising a communication network and a master node server computer configured to assign computing tasks to a plurality of slave node server computers, the slave node server computer comprising:

a processor; and a memory having stored therein a plurality of instructions that, when executed, cause the slave node server computer to establish a slave agent to periodically send energy data and slot availability data to the master node server and receive unlaunched computing tasks from the master node server for execution by the slave node server in response to the energy data and the slot availability data sent by the slave node server to the master node server, wherein the energy data comprises performance energy data associated with a performance per unit of power metric of the slave node server and input/output energy data associated with an input/output operations per unit of power metric of the slave node server, wherein the received unlaunched computing tasks each have a task type that corresponds to the energy data and the slot availability data sent by the slave node server to the master node server, wherein the task type is indicative of whether the unlaunched computing task is a computation-intensive task or an input/output-intensive task and the slot availability data is indicative of whether the slave node server has an available slot for a task of the task type and further wherein the sending of the energy data and slot availability data causes the master node server computer to:

determine a task type for an unlaunched computing task, the task type indicative of whether the unlaunched computing task is a computation-intensive task or an input/output-intensive task;

determine whether the slave node server computer has an available slot for a task of the task type based on a comparison of the task type to the slot availability data;

determine whether the unlaunched computing task should be assigned to the slave node server computer based on a comparison of the task type and the energy data;

assign the unlaunched computing task to the slave node server computer in response to a determination that the slave node server has the available slot and the slave node server is an energy efficient node for the unlaunched computing task; and wherein the slave agent processes the unlaunched computing task assigned by the master node server computer for launching in the slave node server computer.

21. The slave node server computer of claim 20, wherein the master node server and the slave node server are embodied as different server computers.

22. The slave node server computer of claim 20, wherein the master node server and the slave node server are embodied as virtual nodes running on the same server computer.

23. The slave node server computer of claim 20, wherein the energy data comprises a first energy metric including records per joule and a second energy metric including input-output operations per second per watt.

24. The slave node server computer of claim 20, wherein the slave agent is configured to periodically send slot availability data for each task type to the master node server and receive unlaunched computing tasks from the master node server for execution by the slave node server in response to the slot availability data.

* * * * *